United States Patent
Lin

(10) Patent No.: US 9,904,389 B2
(45) Date of Patent: Feb. 27, 2018

(54) TOUCH PANEL WIRE ARRANGEMENT CIRCUIT, DISPLAY PANEL AND DISPLAY DEVICE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Jian-Hong Lin, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 134 days.

(21) Appl. No.: 14/907,504

(22) PCT Filed: Oct. 28, 2015

(86) PCT No.: PCT/CN2015/093081
§ 371 (c)(1),
(2) Date: Jan. 25, 2016

(87) PCT Pub. No.: WO2017/063232
PCT Pub. Date: Apr. 20, 2017

(65) Prior Publication Data
US 2017/0242513 A1    Aug. 24, 2017

(30) Foreign Application Priority Data
Oct. 14, 2015  (CN) .......................... 2015 1 0661015

(51) Int. Cl.
*G06F 3/041* (2006.01)
*G06F 3/047* (2006.01)

(52) U.S. Cl.
CPC ............ *G06F 3/0412* (2013.01); *G06F 3/047* (2013.01)

(58) Field of Classification Search
CPC .... G02F 1/13338; G02F 3/042; G02F 3/0412; G02F 1/13624; G02F 1/136209
See application file for complete search history.

(56) References Cited

U.S. PATENT DOCUMENTS

2014/0313138 A1   10/2014   Jeong et al.

FOREIGN PATENT DOCUMENTS

| CN | 104049800 A | 9/2014 |
| CN | 104317467 A | 1/2015 |
| CN | 104536609 A | 4/2015 |
| CN | 104571655 A | 4/2015 |
| CN | 104765501 A | 7/2015 |

*Primary Examiner* — Shaheda Abdin
(74) *Attorney, Agent, or Firm* — Andrew C. Cheng

(57) ABSTRACT

The present invention provides a touch panel wire arrangement circuit, the touch panel wire arrangement circuit comprises: an ITO region, metal wires, a touch control hole and an integrated circuit; the touch panel wire arrangement circuit further comprises: a rear end switch set, and the rear end switch set comprises: a plurality of switches, and a G electrode of each switch in the plurality of switches is inputted with a switch signal, and D electrodes of the plurality of switches are sequentially coupled to rear ends of the metal wires, and S electrodes of the plurality of switches are inputted with at least one voltage signals; the switch signal is: a signal at high voltage level as a touch panel TP signal does not function; the voltage signal is a common voltage V-com signal as the touch panel is in a display state.

15 Claims, 6 Drawing Sheets

TOUCH PANEL WIRE ARRANGEMENT CIRCUIT, DISPLAY PANEL AND DISPLAY DEVICE

CROSS REFERENCE

This application claims the priority of Chinese Patent Application No. 201510661015.7, entitled "Touch panel wire arrangement circuit, display panel and display device", filed on Oct. 14, 2015, the disclosure of which is incorporated herein by reference in its entirety.

FIELD OF THE INVENTION

The present invention relates to a display field, and more particularly to a touch panel wire arrangement circuit, a display panel and a display device.

BACKGROUND OF THE INVENTION

The Touch Screen can allow the user to slightly touch the icon or text on the display panel with fingers for realizing the operation to the host. Then, the physical device (such buttons, mouse) operation can be disappear to make the human machine interaction can be more straightforward. The main application is applied for Public place hall information inquiry, leading office, electronic game, signal request/menu order, multimedia education, ticket purchase, train ticket sale, smart phone, smart television and tablet.

The signal wire of the touch panel wire arrangement circuit according to prior art generally utilizes the Voltage of common (V-com) electrode in pixel of the Liquid Crystal Display (LCD), and the V-com is used to implement space region division of Touch SCAN (TP) signal. Therefore, the RC of the V-com after division generally becomes over large on the panel display, and the uniformity of the RC is bad, which results in Flicker or the regional display uneven brightness. The display uneven brightness is so called to be mura in the industry.

With combination of FIG. 1, the drawback existing before the present invention is specifically introduced.

Please refer to FIG. 1. FIG. 1 is a diagram of a touch panel wire arrangement circuit according to prior art. As shown in FIG. 1, the number 10 represents the metal line of the touch panel wire arrangement circuit, and the number 11 represents the touch control hole of the touch panel wire arrangement circuit, and the number 12 represents the common indium Tin Oxide (com ITO). The specific form of the common indium Tin Oxide in the touch panel field can be a transparent conductive film of ITO material. The number 121 represents the ITO region after division. As shown in FIG. 1, the metal lines are distributed on the com ITO, and coupled to the V-com electrodes through the touch control hole 10, and the signal of the integrated circuit (IC) is transmitted to each ITO region. As shown in FIG. 1, because the positions of the divided ITO regions are different, the amounts of the divided ITO regions due to the passing metal lines are different. As shown in FIG. 1, the first ITO region 1210 is closer to the IC, the resistance of the IC signal transmitted to the first ITO region 1210 is lower, of which the specific resistance value can be R. For convenience, here the resistance of single ITO region is marked as R. As regarding the ITO region away from the IC, with the longer distance, the fifth ITO region 1215 is illustrated, and the transmittance of the IC signal to the fifth ITO region 1215 needs passing through 5 ITO regions, thus, the resistance of the IC signal is higher than the resistance of the IC signal transmitted to the first ITO region 1210, of which the specific resistance value can be 5R. Therefore, after the TP of the touch panel is shutdown, the touch panel is in the general display mode. Because the resistance of the aforesaid IC signal transmitted to the ITO region is larger, and the distribution of the resistance is not uniform. The RC of the V-com after division is over large, and the RC distribution is not uniform. Consequently, it results in the flicker or regional mura of the display panel.

SUMMARY OF THE INVENTION

An objective of the present invention is to provide a touch panel wire arrangement circuit, and the touch panel wire arrangement circuit diminishes the resistance, and raises the uniformity of the resistance to make the display panel utilizing the touch panel wire arrangement circuit reduce the flicker or mura.

First, a touch panel wire arrangement circuit is provided, the touch panel wire arrangement circuit comprises: an ITO region, metal wires, a touch control hole and an integrated circuit in common Indium Tin Oxide com ITO; wherein the touch panel wire arrangement circuit further comprises:

a rear end switch set, and the rear end switch set comprises: a plurality of switches, and a G electrode of each switch in the plurality of switches is inputted with a switch signal, and D electrodes of the plurality of switches are sequentially coupled to rear ends of the metal wires, and S electrodes of the plurality of switches are inputted with at least one voltage signals;

the switch signal is: a signal at high voltage level as a touch panel TP signal does not function; the voltage signal is a common voltage V-com signal as the touch panel is in a display state.

Combining the touch panel wire arrangement circuit provided by first, in the first selective solution of one, the rear end switch set comprises: a plurality of rear end switch sub sets divided in order, and the rear end switch sub set comprises: n switches, and S electrodes of the n switches are respectively inputted with n voltage signals through n metal wires, and the n voltage signals are: voltage signals of n various voltage signal values as the touch panel is in a front section detection; the n is a natural number larger than or equal to 2.

Combining the first selective solution of first, in the second selective solution of first, the touch panel wire arrangement circuit further comprises a front end switch set, and the front end switch set comprises: a plurality of front end switch sub sets divided in order, and the front end switch sub set comprises: n switches, and S electrodes of the n switches are respectively inputted with n voltage signals through n metal lines, and the n voltage signals are: voltage signals of n various voltage signal values as the touch panel is in a front section detection; a G electrode of each switch in n switches is inputted with a switch signal, and D electrodes of the n switches are sequentially coupled to front ends of the metal wires; voltages inputted to all the metal wires are the same voltage signal.

Combining the first selective solution of first, in the third selective solution of first, the n is equal to 2.

Combining the second selective solution of first, in the fourth selective solution of first, the n is equal to 2.

Combining the touch panel wire arrangement circuit provided by first, in the fifth selective solution of one, the switch is a thin film transistor TFT.

Combining the first selective solution provided by first, in the sixth selective solution of first, the switch is a thin film transistor TFT.

Second, a display panel is provided, and the display panel comprises a touch panel wire arrangement circuit, the touch panel wire arrangement circuit comprises: an ITO region, metal wires, a touch control hole and an integrated circuit in common Indium Tin Oxide com ITO; wherein the touch panel wire arrangement circuit further comprises:

a rear end switch set, and the rear end switch set comprises: a plurality of switches, and a G electrode of each switch in the plurality of switches is inputted with a switch signal, and D electrodes of the plurality of switches are sequentially coupled to rear ends of the metal wires, and S electrodes of the plurality of switches are inputted with at least one voltage signals;

the switch signal is: a signal at high voltage level as a touch panel TP signal does not function; the voltage signal is a common voltage V-com signal as the touch panel is in a display state.

Combining the display panel provided by second, in the first selective solution of second, the rear end switch set comprises: a plurality of rear end switch sub sets divided in order, and the rear end switch sub set comprises: n switches, and S electrodes of the n switches are respectively inputted with n voltage signals through n metal wires, and the n voltage signals are: voltage signals of n various voltage signal values as the touch panel is in a front section detection; the n is a natural number larger than or equal to 2.

Combining the first selective solution of second, in the second selective solution of second, the touch panel wire arrangement circuit further comprises a front end switch set, and the front end switch set comprises: a plurality of front end switch sub sets divided in order, and the front end switch sub set comprises: n switches, and S electrodes of the n switches are respectively inputted with n voltage signals through n metal lines, and the n voltage signals are: voltage signals of n various voltage signal values as the touch panel is in a front section detection; a G electrode of each switch in n switches is inputted with a switch signal, and D electrodes of the n switches are sequentially coupled to front ends of the metal wires; voltages inputted to all the metal wires are the same voltage signal.

Combining the first selective solution of second, in the third selective solution of second, the n is equal to 2.

Combining the second selective solution of second, in the fourth selective solution of second, the n is equal to 2.

Combining the display panel provided by second, in the fifth selective solution of second, the switch is a thin film transistor TFT.

Combining the first selective solution provided by second, in the sixth selective solution of first, the switch is a thin film transistor TFT.

Third, a display device is provided, and the display device comprises: a display panel, and the display panel comprises a touch panel wire arrangement circuit, the touch panel wire arrangement circuit comprises: an ITO region, metal wires, a touch control hole and an integrated circuit in common Indium Tin Oxide com ITO; wherein the touch panel wire arrangement circuit further comprises:

a rear end switch set, and the rear end switch set comprises: a plurality of switches, and a G electrode of each switch in the plurality of switches is inputted with a switch signal, and D electrodes of the plurality of switches are sequentially coupled to rear ends of the metal wires, and S electrodes of the plurality of switches are inputted with at least one voltage signals;

the switch signal is: a signal at high voltage level as a touch panel TP signal does not function; the voltage signal is a common voltage V-com signal as the touch panel is in a display state.

Combining the display device provided by third, in the first selective solution of third, the rear end switch set comprises: a plurality of rear end switch sub sets divided in order, and the rear end switch sub set comprises: n switches, and S electrodes of the n switches are respectively inputted with n voltage signals through n metal wires, and the n voltage signals are: voltage signals of n various voltage signal values as the touch panel is in a front section detection; the n is a natural number larger than or equal to 2.

Combining the first selective solution of third, in the second selective solution of third, the touch panel wire arrangement circuit further comprises a front end switch set, and the front end switch set comprises: a plurality of front end switch sub sets divided in order, and the front end switch sub set comprises: n switches, and S electrodes of the n switches are respectively inputted with n voltage signals through n metal lines, and the n voltage signals are: voltage signals of n various voltage signal values as the touch panel is in a front section detection; a G electrode of each switch in n switches is inputted with a switch signal, and D electrodes of the n switches are sequentially coupled to front ends of the metal wires; voltages inputted to all the metal wires are the same voltage signal.

Combining the first selective solution of third, in the third selective solution of third, the n is equal to 2.

Combining the second selective solution of third, in the fourth selective solution of third, the n is equal to 2.

Combining the display device provided by three, in the fifth selective solution of three, the switch is a thin film transistor TFT.

According to the a touch panel wire arrangement circuit, the display panel and the display device, the switch set is added to the com ITO rear end, thus the IC signal can be transmitted to each ITO region through the front end (or head end) and the rear end. Then the resistances of the IC signal transmitted to each ITO region can be a parallel connection resistance value of the resistance of the front end IC signal transmitted to each ITO region and the resistance of the rear end IC signal transmitted to each ITO region. Accordingly, the value of the resistance is diminished, and the uniformity of the resistance is raised to reduce the flicker or the regional mura of the display panel.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

In figures provided by the specific embodiment of the present invention, if no circle dot exists at the two intersecting full lines, it means that the two intersecting full lines are not electrically coupled. On the contrary, in figures, if a circle dot exists at the two intersecting full lines, it means that the two intersecting full lines are electrically coupled.

Figure 1:
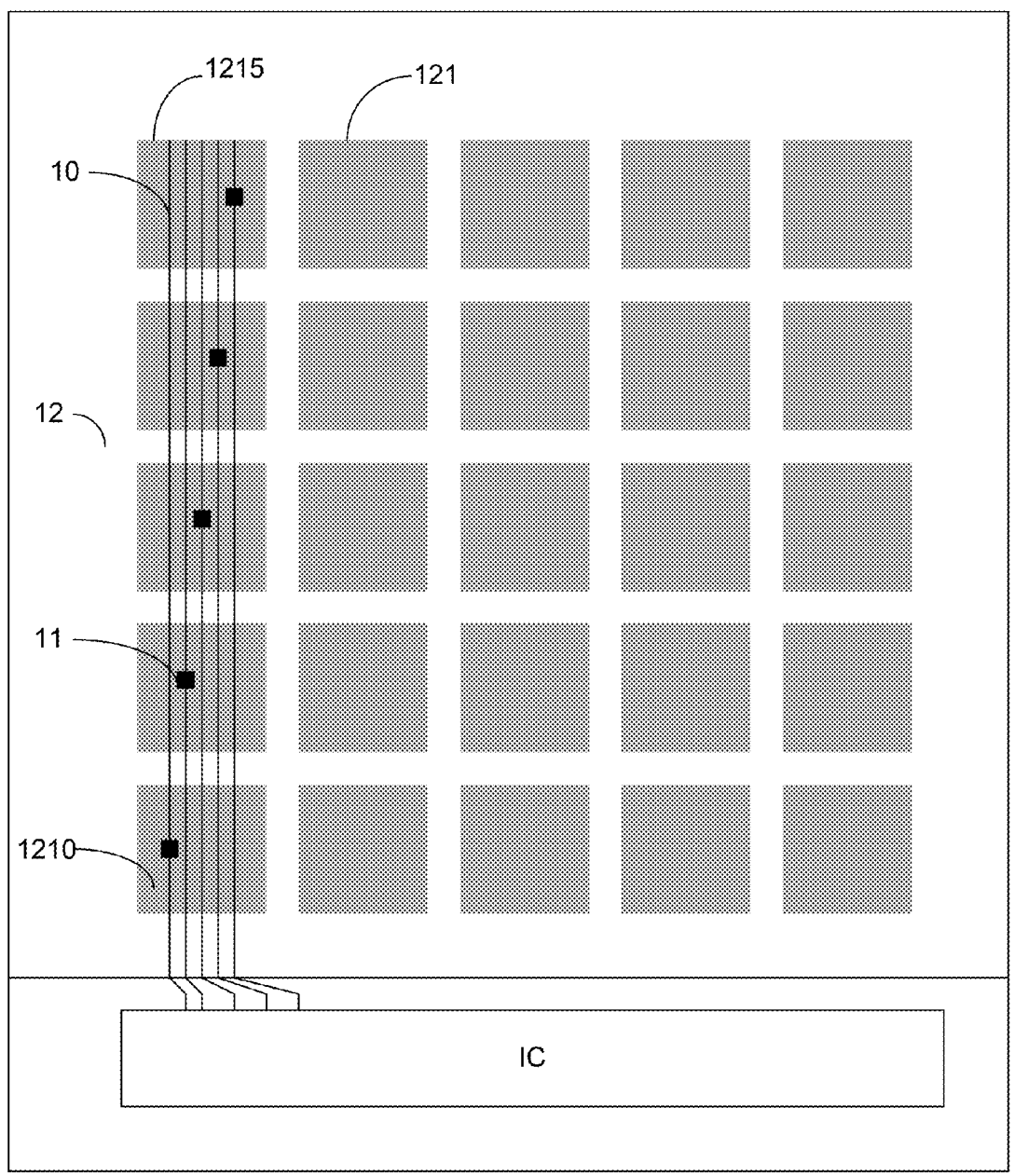
FIG. 1 is a diagram of a touch panel wire arrangement circuit according to prior art.
Figure 2:
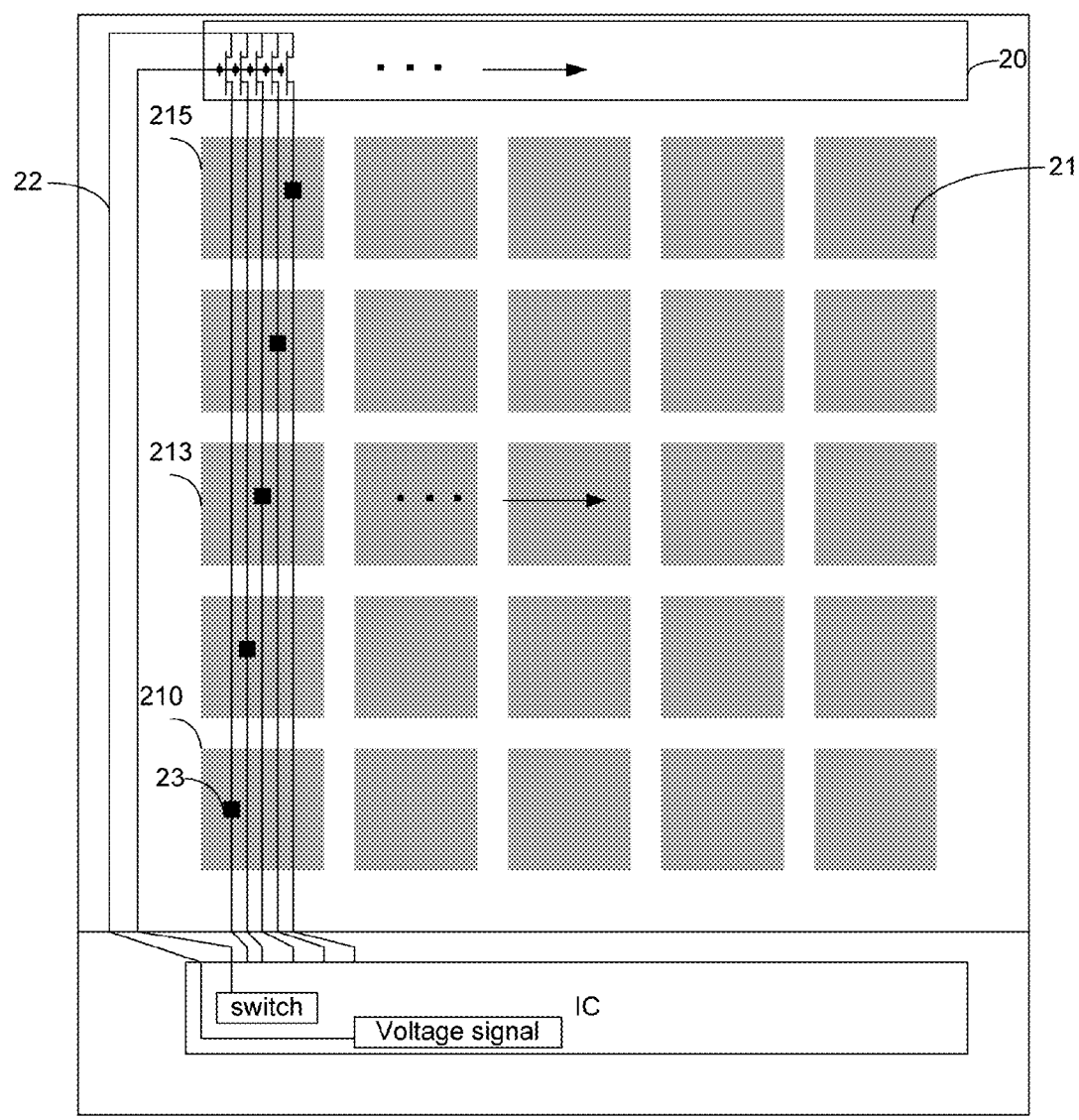
FIG. 2 is a diagram of a touch panel wire arrangement circuit according to the first preferred embodiment of the present invention.

Please refer to FIG. 2. FIG. 2 is a diagram of a touch panel wire arrangement circuit according to the first preferred embodiment of the present invention. As shown in FIG. 2, the touch panel wire arrangement circuit can comprise: an ITO region 21, metal wires 22, a touch control hole 23 and an integrated circuit IC in com ITO; wherein the touch panel wire arrangement circuit is added with a switch set 20, and the switch set 20 can comprise: a plurality of switches, and a G (gate) electrode of each switch in the plurality of switches is inputted with a switch signal, and D (drain) electrodes of the plurality of switches are sequentially coupled to rear ends of the metal wires 22, and S (source) electrodes of the plurality of switches are inputted with at least one voltage signals; the switch signal can be: a signal at high voltage level as a TP signal does not function; the voltage signal can be a V-com signal as the touch panel is in a display state.

In the touch panel field, generally the end close to the IC side is named to be front end (or head end), and the end away from the IC side is named to be rear end. The aforesaid IC can choose the Touch panel TP type IC, and the specific type number can be: FT5316 IC (focal company). Certainly, the ICs of other types can be utilized for replacement. The present invention does not restrict the specific type of the aforesaid IC.

In the touch panel field, that the TP signal does not function specifically can comprises: TP signal is not in the TP sensing (touch panel detection duration); the duration that the TP signal does not function comprises but not limited thereto: the TP signal is in LCD Display duration and the touch panel is in a front detection duration (i.e. the IC is not online ready).

Please refer to FIG. 2. The S (source) electrodes of the plurality of switches in FIG. 2 are inputted with a voltage signal. The effect of the first preferred embodiment of the present invention is explained below according to FIG. 2 and the working principle of the first preferred embodiment of the present invention. Because the switch set 20 is added at the rear end, as the TP does not function, the switch signal outputs high voltage level, and the switches of the switch set are all activated. Then, the voltage signal can be the V-com signal, and the V-com signal can be inputted to each ITO region through the front end and the rear end of the com ITO; for convenience, the resistor of single ITO region is set to be R, and the resistor from the V-com signal to each ITO region (for convenience, the resistor from the V-com signal to each ITO region is named to be Rparallel) is the parallel connection of the resistance of the V-com signal inputted from the front end to each ITO region and the resistance of the V-com signal inputted from the rear end to each ITO region, and Rfront represents the resistance of the V-com signal inputted from the front end to each ITO region, and Rrear represents the resistance of the V-com signal inputted from the rear end to each ITO region; the first ITO region 210 is illustrated, Rfront 210=R; Rrear 210=5R, and Rparallel 210=0.84R; the third ITO region 213 is illustrated, Rfront 213=3R; Rrear 213=3R, and Rparallel 213=1.5R; the fifth ITO region 215 is illustrated, Rfront 215=R; Rrear 215=5R, and Rparallel 215=0.84R; as being described in the aforesaid calculations after employing the technical solution of the first preferred embodiment of the present invention, in the first illustration, the resistance of the V-com signal inputted to each ITO region in the first column is decreased from the largest 5R to 1.5R, and the smallest resistance is decreased from R to 0.84R, thus, the first preferred embodiment of the present invention reduce the resistance of the V-corn signal transmitted to the ITO region; besides, the largest difference of the resistances in the solution of prior art is 4R, but the largest difference of the resistances in the solution utilizing the first preferred embodiment of the present invention is 0.66R. Therefore, the uniformity of the resistances in the solution of the first preferred embodiment of the present invention is good. The first preferred embodiment of the present invention can effectively reduce the flicker and the regional mura of the display panel. When the TP functions, i.e. TP is in the TP sensing, then the switch signal outputs low voltage level, and all switches in the switch set 20 are deactivated, and all switches do not function. The V-corn signal cannot be transmitted to the ITO region, and TP scan will not be influenced.

Please refer to FIG. 2. because the switch signal in the first preferred embodiment of the present invention is high voltage level as the TP signal does not function, and will not influence the touch panel scan, and effectively reduce the short phenomenon of the touch panel. If the switch signal is also at high voltage level as the TP signal is in TP sensing, due to the high voltage level of the switch signal, all the switches in the switch set will be activated so that the V-corn signal can be transmitted to each ITO region. Because the TP signal is in TP sensing, as a touch signal is detected, the touch signal can be transmitted to the ITO region, then there are two different signals in the ITO region, which can easily cause short of the ITO region. Therefore, that the switch signal is high voltage level as the TP signal does not function can effectively reduce the short of the touch panel to reduce the failure rate and raise the safety.

Figure 3:
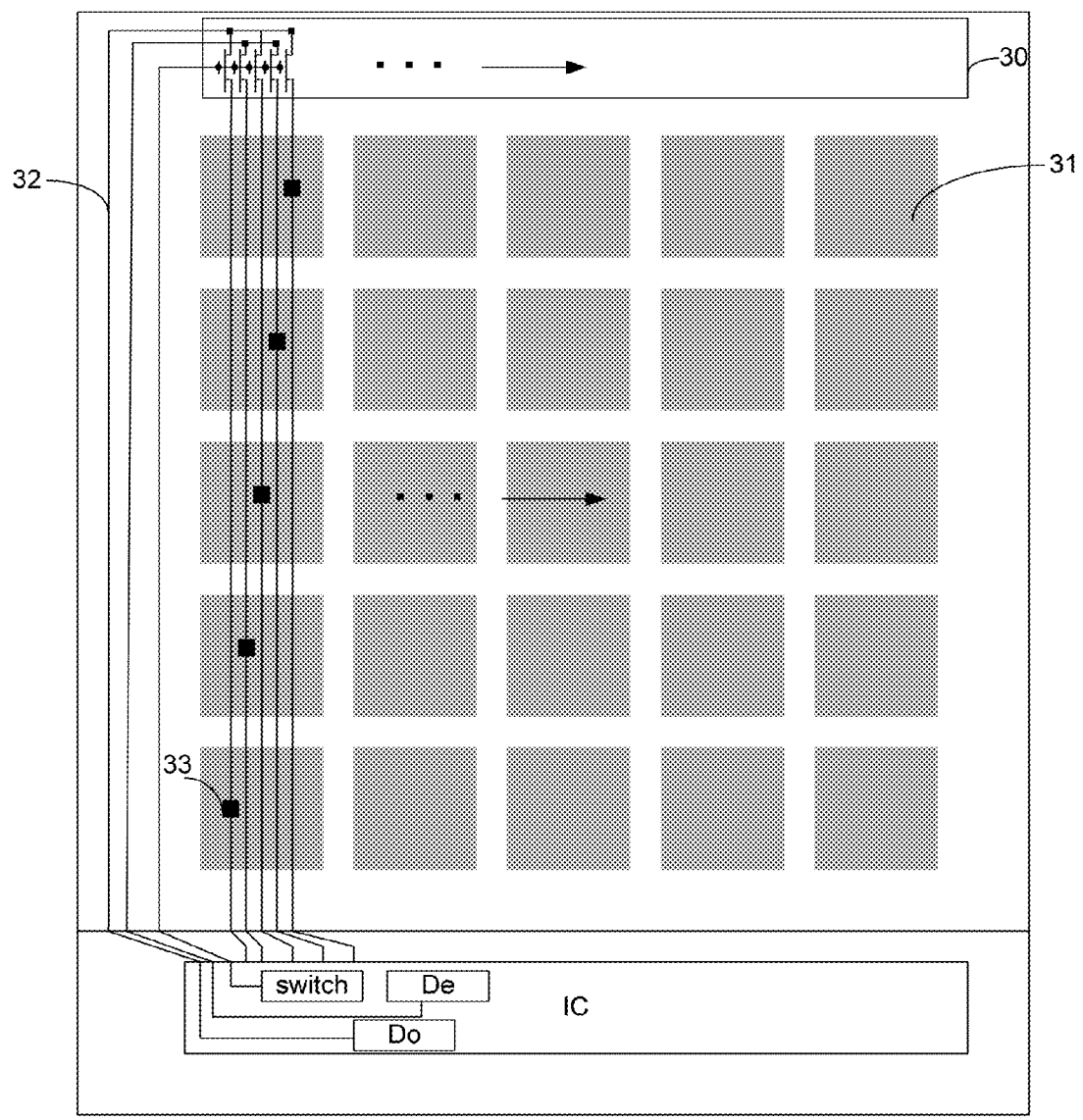
FIG. 3 is a diagram of a touch panel wire arrangement circuit according to the second preferred embodiment of the present invention.

Please refer to FIG. 3. FIG. 3 is a diagram of a touch panel wire arrangement circuit according to the second preferred embodiment of the present invention. As shown in FIG. 3, the touch panel wire arrangement circuit can comprise: an ITO region 31, metal wires 32, a touch control hole 33 and an integrated circuit IC in corn ITO; wherein the touch panel wire arrangement circuit is added with a switch set 30, and the switch set 30 can comprise: a plurality of switches, and a G (gate) electrode of each switch in the plurality of switches is inputted with a switch signal, and D (drain) electrodes of the plurality of switches are sequentially coupled to rear ends of the metal wires in the com ITO, and adjacent S (source) electrodes of the plurality of switches are respectively inputted with a De voltage signal and a Do voltage signal through two metal wires 32; the aforesaid switch signal specifically can be: a signal at high voltage level as a TP signal does not function; in the first solution of the second preferred embodiment of the present invention, the aforesaid De voltage signal and the Do voltage signal specifically can be: a V-com signal as the touch panel is in a display state.

In the touch panel field, generally the end close to the IC side is named to be front end (or head end), and the end away from the IC side is named to be rear end.

In the touch panel field, that the TP signal does not function specifically can comprises: TP signal is not in the TP sensing (touch panel detection duration); that the TP signal does not function comprises but not limited thereto: the TP signal is in LCD Display duration and the touch panel is in a front detection duration (i.e. the IC is not online ready). When the IC is not online ready, the De voltage signal, the Do voltage signal and the switch signal are all provided by the pins of the test platform. Certainly in practical application, the aforesaid signals can be provided by other apparatuses or devices, such as the test specific IC.

Please refer to FIG. 3. The S (source) electrodes of the plurality of switches in FIG. 3 are respectively inputted with the De voltage signal and the Do voltage signal through two metal wires 32. The effect of the second preferred embodiment of the present invention is explained below according to FIG. 3 and the working principle of the second preferred embodiment of the present invention. Because the switch set 30 is added at the rear end, as the TP does not function, the switch signal outputs high voltage level, and the switches of the switch set are all activated. Then, the De voltage signal and the Do voltage signal both can be the V-com signal, and the V-com signal can be inputted to each ITO region through the front end and the rear end of the com ITO; for convenience, the resistor of single ITO region is set to be R, and the resistor from the V-com signal to each ITO region is the parallel connection of the resistance of the V-corn signal inputted from the front end to each ITO region and the resistance of the V-corn signal inputted from the rear end to each ITO region. The largest difference of the resistances in the solution of prior art is 4R, but the resistance of the V-corn signal inputted to each ITO region in the first column is decreased from the largest 5R to 1.5R (the specific calculation can be referred to that in the first preferred embodiment of the present invention), and the largest difference of the resistances is 0.66R (the specific calculation can be referred to that in the first preferred embodiment of the present invention). Therefore, the uniformity of the resistances in the solution of the second preferred embodiment of the present invention is good. The second preferred embodiment of the present invention can effectively reduce the flicker and the regional mura of the display panel. When the TP functions, i.e. TP is in the TP sensing, then the switch signal outputs low voltage level, and all switches in the switch set 20 are deactivated, and all switches do not function. The V-corn signal cannot be transmitted to the ITO region, and TP scan will not be influenced.

In the second solution of the second preferred embodiment of the present invention, the aforesaid De voltage signal and the Do voltage signal specifically can be: a pair of positive and negative voltage signals when the touch panel is in the front detection (i.e. the IC is not online ready).

In one embodiment of the present invention, the aforesaid positive and negative voltage signals specifically can comprise: a high voltage level voltage signal and a low voltage level voltage signal, wherein the De voltage signal can be the high voltage level signal, and the Do voltage signal can be the low voltage level signal. In other embodiment of the present invention, the aforesaid positive and negative voltage signals specifically can comprise: a low voltage level voltage signal and a high voltage level voltage signal, wherein the De voltage signal can be the low voltage level signal, and the Do voltage signal can be the high voltage level signal.

In the touch panel field, the aforesaid high voltage level voltage signal generally can be named as a positive detection signal, and the aforesaid low voltage level voltage signal generally can be named as a negative detection signal.

The effect of the second preferred embodiment of the present invention is explained below according to the working principle of the second preferred embodiment of the present invention. As shown in FIG. 3, the adjacent S (source) electrodes of the plurality of switches are respectively inputted with the De voltage signal and the Do voltage signal through two metal wires 32. Because the switch set 30 is added at the rear end, as the TP does not function, the switch signal outputs high voltage level, and the switches of the switch set are all activated. Then, the De voltage signal and the Do voltage signal respectively can be a high voltage level voltage signal and a low voltage level voltage signal. Then, the plurality of adjacent switches are respectively inputted with the De voltage signal and the Do voltage signal. After the switches are activated, the De voltage signal and the Do voltage signal are respectively inputted into the adjacent ITO regions through the adjacent metal wires. Then, the adjacent ITO regions appear the states which are alternately bright and dark. If there is a damage ITO region in the com ITO, the damage ITO region will not appear the states which are alternately bright and dark with the adjacent ITO regions. Accordingly, the detection employee can easily distinguish the damage ITO region in the com ITO. Therefore, the second solution according to the second preferred embodiment of the present invention possesses the advantage of easy detection of damaged ITO region. When the TP functions, i.e. TP is in the TP sensing, then the switch signal outputs low voltage level, and all switches in the switch set 30 are deactivated, and all switches do not function. The V-com signal cannot be transmitted to the ITO region, and TP scan will not be influenced.

Figure 4:
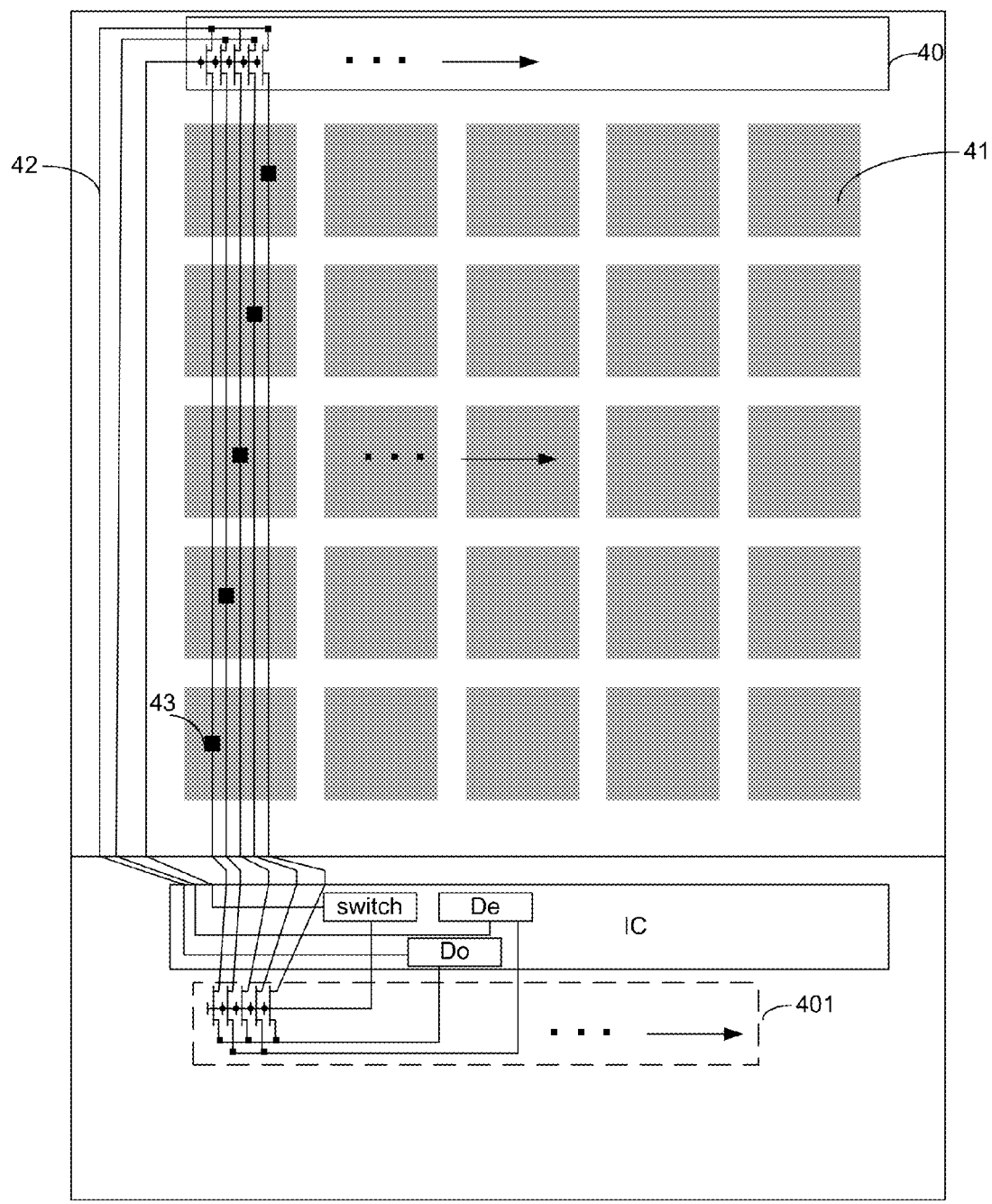
FIG. 4 is a diagram of a touch panel wire arrangement circuit according to the third preferred embodiment of the present invention.

Please refer to FIG. 4. FIG. 4 is a diagram of a touch panel wire arrangement circuit according to the third preferred embodiment of the present invention. As shown in FIG. 4, the touch panel wire arrangement circuit can comprise: an ITO region 41, metal wires 42, a touch control hole 43 and an integrated circuit IC in the com ITO; wherein the present touch panel wire arrangement circuit is added with a front end switch set 40 and a rear end switch set 401, and both the front end switch set 40 and the rear end switch set 401 can comprise: a plurality of switches, and a G (gate) electrode of each switch in the plurality of switches is inputted with a switch signal, and D (drain) electrodes of the plurality of switches are sequentially coupled to the metal wires in the com ITO, and adjacent S (source) electrodes of the plurality of switches are respectively inputted with a De voltage signal and a Do voltage signal through two metal wires 42; the aforesaid switch signal specifically can be: a signal at high voltage level as a TP signal does not function; in the third preferred embodiment of the present invention, the aforesaid De voltage signal and the Do voltage signal specifically can be: a pair of positive and negative voltage signals when the touch panel is in the front detection (i.e. the IC is not online ready); the electric signals inputted to all the metal wires in the com ITO are the same electric signal, and the setting is to prevent the front end of the metal line to be inputted with the high voltage level voltage signal, and the rear end of the metal line to be inputted with the low voltage level voltage signal. Consequently, this will make that the voltage signals inputted to the same ITO region are different and cannot display.

In one embodiment of the present invention, the aforesaid positive and negative voltage signals specifically can comprise: a high voltage level voltage signal and a low voltage level voltage signal, wherein the De voltage signal can be the high voltage level signal, and the Do voltage signal can be the low voltage level signal. In other embodiment of the present invention, the aforesaid positive and negative voltage signals specifically can comprise: a low voltage level voltage signal and a high voltage level voltage signal, wherein the De voltage signal can be the low voltage level signal, and the Do voltage signal can be the high voltage level signal.

In the touch panel field, the aforesaid high voltage level voltage signal generally can be named as a positive detection signal, and the aforesaid low voltage level voltage signal generally can be named as a negative detection signal.

The solution of the third preferred embodiment of the present invention provides a front end switch set and a rear end switch set. Such solution decreases the resistances of the De voltage signal and the Do voltage signal inputted to the ITO region as front detection. Because the De voltage signal and the Do voltage signal can input the De voltage signal and the Do voltage signal through the front end switch set and the rear end switch set at the same time. Then, the resistances of the De voltage signal and the Do voltage signal inputted to the ITO region are similar with the resistance from the V-com signal to each ITO region in the first preferred embodiment of the present invention and the second preferred embodiment of the present invention, which all are resistances in parallel. Therefore, the third preferred embodiment of the present invention can effectively reduce the resistances of the De voltage signal and the Do voltage signal inputted into the ITO region as front detection.

Preferably, the aforesaid switches all can be TFTs (Thin Film Transistors). Certainly, in practical application, other types of switches, such as field effect transistors can be chose.

Figure 5:
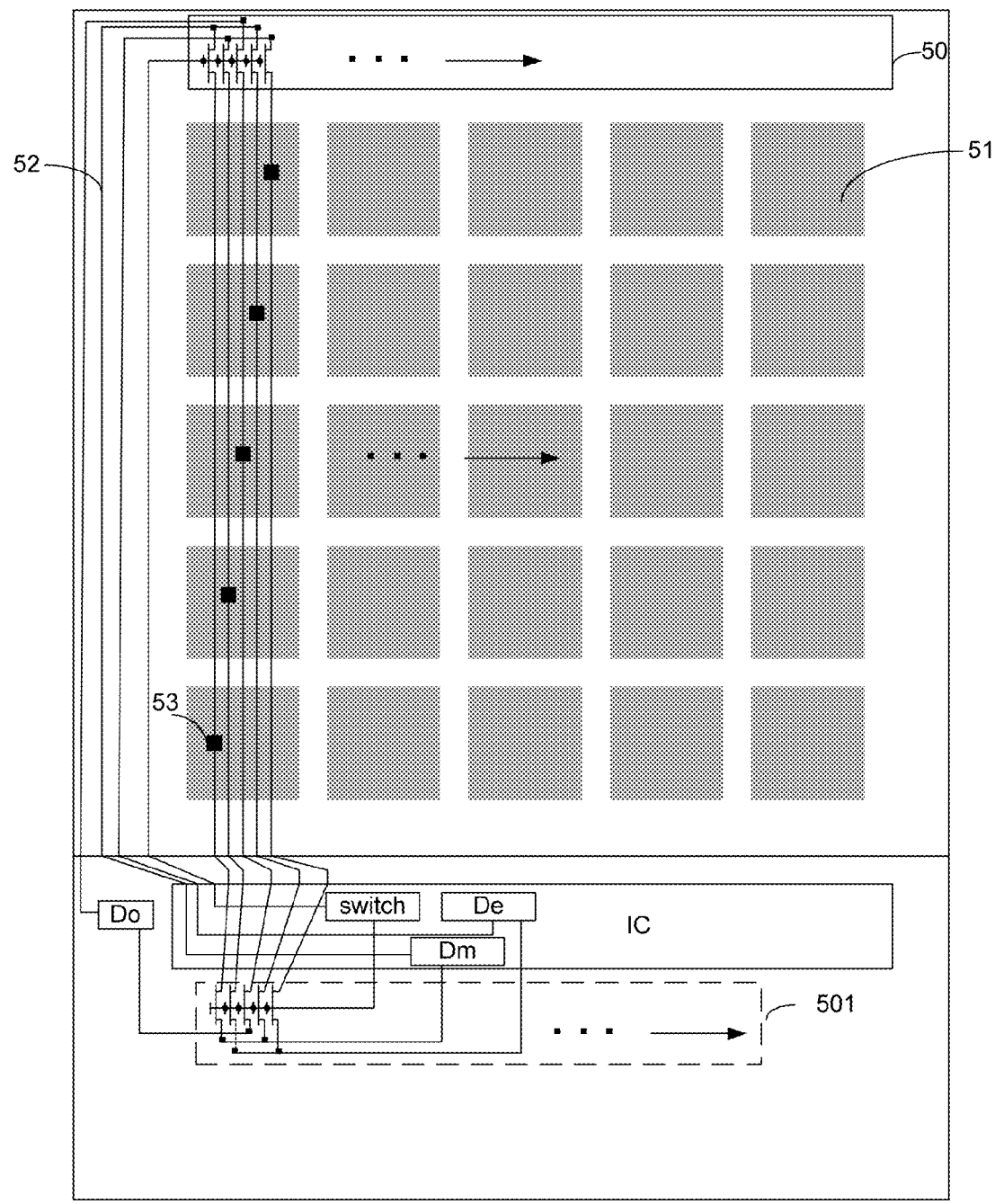
FIG. 5 is a diagram of a touch panel wire arrangement circuit according to the fourth preferred embodiment of the present invention.
Figure 6:
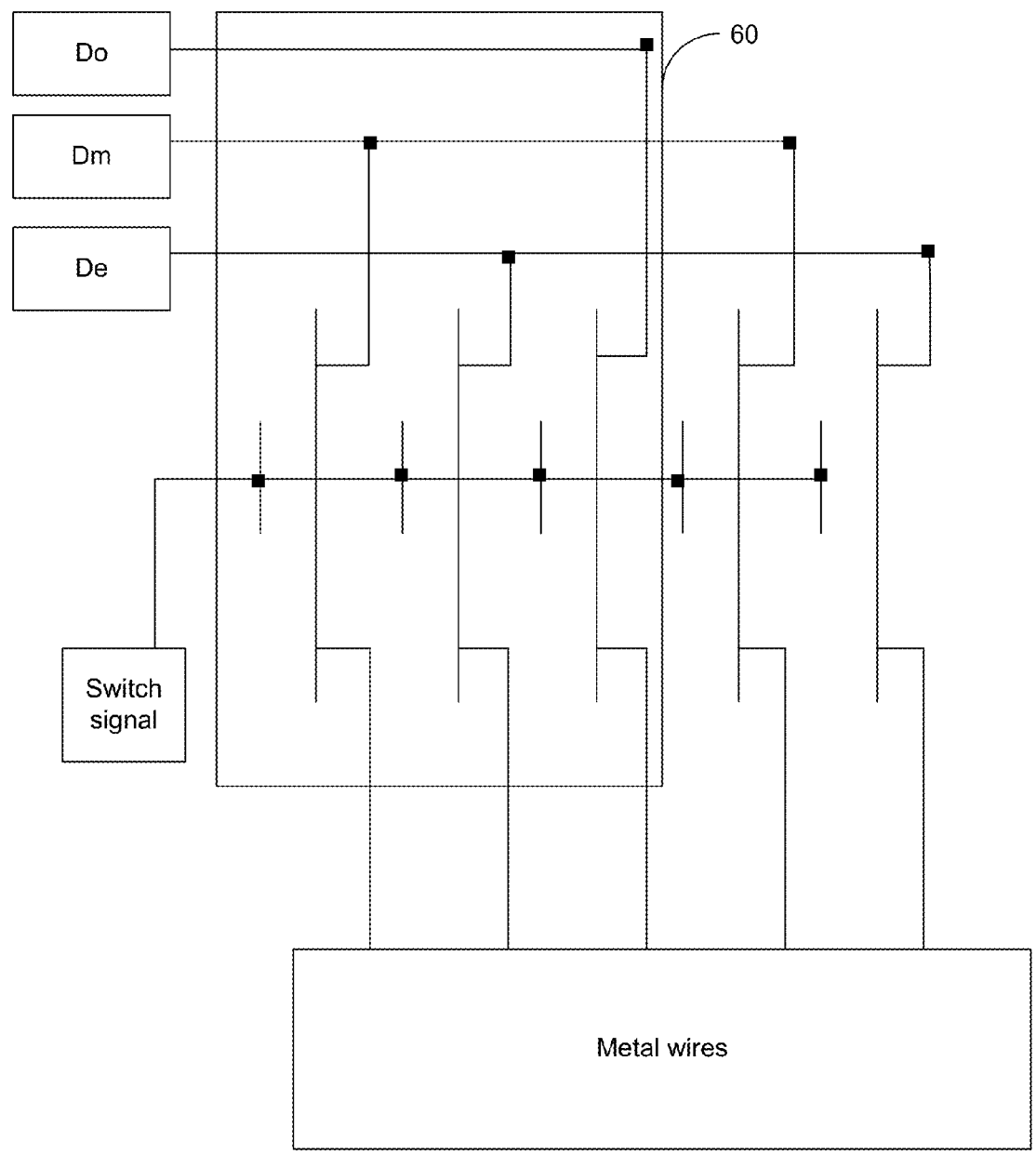
FIG. 6 is an enlarged diagram of a rear end switch set provided by the third preferred embodiment of the present invention.

Please refer to FIG. 5, FIG. 6. FIG. 5 is a diagram of a touch panel wire arrangement circuit according to the fourth preferred embodiment of the present invention. FIG. 6 is an enlarged diagram of a front end switch set, wherein 60 represents the front end switch set; as shown in FIG. 5, the touch panel wire arrangement circuit can comprise: an ITO region 51, metal wires 52, a touch control hole 53 and an integrated circuit IC in the com ITO; wherein the present touch panel wire arrangement circuit is added with a front end switch set 50 and a rear end switch set 501, and both the front end switch set 50 and the rear end switch set 501 can comprise: a plurality of switches, and a G (gate) electrode of each switch in the plurality of switches is inputted with a switch signal, and D (drain) electrodes of the plurality of switches are sequentially coupled to the metal wires 52 in the com ITO, and the plurality of switches are divided into a plurality of switch sub sets in order, and each switch sub set comprises n (here, n=3 is illustrated) switches, and S (source) electrodes of the three switches in each switch sub set are respectively inputted with a De voltage signal, a Dm voltage signal and a Do voltage signal; the aforesaid switch signal specifically can be: a signal at high voltage level as the TP signal does not function; in the fourth preferred embodiment of the present invention, the De voltage signal, the Dm voltage signal and the Do voltage signal can be voltage signals of various voltage values as the touch panel is in front detection (i.e. the IC is not online ready); the voltage signals inputted to all the metal wires in the com ITO are the same voltage signal, and the setting is to prevent the front end of the metal line to be inputted with the high voltage level voltage signal, and the rear end of the metal line to be inputted with the low voltage level voltage signal. Consequently, this will make that the voltage signals inputted to the same ITO region are different and cannot display.

In one embodiment of the present invention, the aforesaid voltage signals of various voltage values specifically can comprise: a high voltage level voltage signal, a middle voltage level voltage signal and a low voltage level voltage signal, wherein the De voltage signal can be the high voltage level voltage signal, and the Dm voltage signal can be the middle voltage level voltage signal, and the Do voltage signal can be the low voltage level voltage signal. In another embodiment of the present invention, the aforesaid voltage signals of various voltage values also can be replaced. For instance, the Do voltage signal can be the high voltage level voltage signal, and the Dm voltage signal can be the middle voltage level voltage signal, and the De voltage signal can be the low voltage level voltage signal; certainly, it also can be that the Dm voltage signal can be the high voltage level voltage signal, and the De voltage signal can be the middle voltage level voltage signal, and the Do voltage signal can be the low voltage level voltage signal; certainly in practical application, there are other combinations, too. In the fourth preferred embodiment of the present invention, it is not restricted that the aforesaid De, Dm, Do specifically belong to which voltage signals. AS long as the aforesaid De, Dm, Do voltage signals are different; the repeated description is omitted here.

The solution of the fourth preferred embodiment of the present invention provides a front end switch set and a rear end switch set. Such solution decreases the resistances of the three kinds of voltage signals inputted to the ITO region as front detection. Because the voltage signals of three kinds can be inputted into the ITO region through the front end switch set and the rear end switch set at the same time. Then, the resistances of the voltage signals of three kinds inputted into the ITO region are similar with the resistance from the V-com signal to each ITO region in the first preferred embodiment of the present invention and the second preferred embodiment of the present invention, which all are resistances in parallel. Therefore, the fourth preferred embodiment of the present invention can effectively reduce the resistances of the voltage signals of three kinds inputted into the ITO region as front detection. However, compared with the third preferred embodiment of the present invention, one metal line is added, the wiring is complicated, which results in the increase of the integration, and the cost is increased. Besides, if n is larger than 3, the connection of the corresponding switches is similar with the connection as the n is equal to 3. The technical result and drawback are similar with that as then is equal to 3. The repeated description is omitted here.

Besides, the present invention further provides a display panel, and the display panel comprises: a touch panel wire arrangement circuit.

Please refer to FIG. 2. FIG. 2 is a diagram of a touch panel wire arrangement circuit according to the first preferred embodiment of the present invention. As shown in FIG. 2, the touch panel wire arrangement circuit can comprise: an ITO region 21, metal wires 22, a touch control hole 23 and an integrated circuit IC in com ITO; wherein the touch panel wire arrangement circuit is added with a switch set 20, and the switch set 20 can comprise: a plurality of switches, and a G (gate) electrode of each switch in the plurality of switches is inputted with a switch signal, and D (drain) electrodes of the plurality of switches are sequentially coupled to rear ends of the metal wires 22, and S (source) electrodes of the plurality of switches are inputted with at least one voltage signals; the switch signal can be: a signal at high voltage level as a TP signal does not function; the voltage signal can be a V-com signal as the touch panel is in a display state.

In the touch panel field, generally the end close to the IC side is named to be front end (or head end), and the end away from the IC side is named to be rear end. The aforesaid IC can choose the Touch panel TP type IC, and the specific type number can be: FT5316 IC (focal company). Certainly, the ICs of other types can be utilized for replacement. The present invention does not restrict the specific type of the aforesaid IC.

In the touch panel field, that the TP signal does not function specifically can comprises: TP signal is not in the TP sensing (touch panel detection duration); the duration that the TP signal does not function comprises but not limited thereto: the TP signal is in LCD Display duration and the touch panel is in a front detection duration (i.e. the IC is not online ready).

Please refer to FIG. 2. The S (source) electrodes of the plurality of switches in FIG. 2 are inputted with a voltage signal. The effect of the first preferred embodiment of the present invention is explained below according to FIG. 2 and the working principle of the first preferred embodiment of the present invention. Because the switch set 20 is added at the rear end, as the TP does not function, the switch signal outputs high voltage level, and the switches of the switch set are all activated. Then, the voltage signal can be the V-com signal, and the V-com signal can be inputted to each ITO region through the front end and the rear end of the com ITO; for convenience, the resistor of single ITO region is set to be R, and the resistor from the V-com signal to each ITO region (for convenience, the resistor from the V-com signal to each ITO region is named to be Rparallel) is the parallel connection of the resistance of the V-com signal inputted from the front end to each ITO region and the resistance of the V-com signal inputted from the rear end to each ITO region, and Rfront represents the resistance of the V-com signal inputted from the front end to each ITO region, and Rrear represents the resistance of the V-com signal inputted from the rear end to each ITO region; the first ITO region 210 is illustrated, Rfront 210=R; Rrear 210=5R, and Rparallel 210=0.84R; the third ITO region 213 is illustrated, Rfront 213=3R; Rrear 213=3R, and Rparallel 213=1.5R; the fifth ITO region 215 is illustrated, Rfront 215=R; Rrear 215=5R, and Rparallel 215=0.84R; as being described in the aforesaid calculations after employing the technical solution of the first preferred embodiment of the present invention, in the first illustration, the resistance of the V-com signal inputted to each ITO region in the first column is decreased from the largest 5R to 1.5R, and the smallest resistance is decreased from R to 0.84R, thus, the first preferred embodiment of the present invention reduce the resistance of the V-com signal transmitted to the ITO region; besides, the largest difference of the resistances in the solution of prior art is 4R, but the largest difference of the resistances in the solution utilizing the first preferred embodiment of the present invention is 0.66R. Therefore, the uniformity of the resistances in the solution of the first preferred embodiment of the present invention is good. The first preferred embodiment of the present invention can effectively reduce the flicker and the regional mura of the display panel. When the TP functions, i.e. TP is in the TP sensing, then the switch signal outputs low voltage level, and all switches in the switch set 20 are deactivated, and all switches do not function. The V-com signal cannot be transmitted to the ITO region, and TP scan will not be influenced.

Please refer to FIG. 2. because the switch signal in the first preferred embodiment of the present invention is high voltage level as the TP signal does not function, and will not influence the touch panel scan, and effectively reduce the short phenomenon of the touch panel. If the switch signal is also at high voltage level as the TP signal is in TP sensing, due to the high voltage level of the switch signal, all the switches in the switch set will be activated so that the V-com signal can be transmitted to each ITO region. Because the TP signal is in TP sensing, as a touch signal is detected, the touch signal can be transmitted to the ITO region, then there are two different signals in the ITO region, which can easily cause short of the ITO region. Therefore, that the switch signal is high voltage level as the TP signal does not function can effectively reduce the short of the touch panel to reduce the failure rate and raise the safety.

Please refer to FIG. 3. FIG. 3 is a diagram of a touch panel wire arrangement circuit according to the second preferred embodiment of the present invention. As shown in FIG. 3, the touch panel wire arrangement circuit can comprise: an ITO region 31, metal wires 32, a touch control hole 33 and an integrated circuit IC in com ITO; wherein the touch panel wire arrangement circuit is added with a switch set 30, and the switch set 30 can comprise: a plurality of switches, and a G (gate) electrode of each switch in the plurality of switches is inputted with a switch signal, and D (drain) electrodes of the plurality of switches are sequentially coupled to rear ends of the metal wires in the com ITO, and adjacent S (source) electrodes of the plurality of switches are respectively inputted with a De voltage signal and a Do voltage signal through two metal wires 32; the aforesaid switch signal specifically can be: a signal at high voltage level as a TP signal does not function; in the first solution of the second preferred embodiment of the present invention, the aforesaid De voltage signal and the Do voltage signal specifically can be: a V-com signal as the touch panel is in a display state.

In the touch panel field, generally the end close to the IC side is named to be front end (or head end), and the end away from the IC side is named to be rear end.

In the touch panel field, that the TP signal does not function specifically can comprises: TP signal is not in the TP sensing (touch panel detection duration); that the TP signal does not function comprises but not limited thereto: the TP signal is in LCD Display duration and the touch panel is in a front detection duration (i.e. the IC is not online ready). When the IC is not online ready, the De voltage signal, the Do voltage signal and the switch signal are all provided by the pins of the test platform. Certainly in practical application, the aforesaid signals can be provided by other apparatuses or devices, such as the test specific IC.

Please refer to FIG. 3. The S (source) electrodes of the plurality of switches in FIG. 3 are respectively inputted with the De voltage signal and the Do voltage signal through two metal wires 32. The effect of the second preferred embodiment of the present invention is explained below according to FIG. 3 and the working principle of the second preferred embodiment of the present invention. Because the switch set 30 is added at the rear end, as the TP does not function, the switch signal outputs high voltage level, and the switches of the switch set are all activated. Then, the De voltage signal and the Do voltage signal both can be the V-corn signal, and the V-corn signal can be inputted to each ITO region through the front end and the rear end of the corn ITO; for convenience, the resistor of single ITO region is set to be R, and the resistor from the V-corn signal to each ITO region is the parallel connection of the resistance of the V-corn signal inputted from the front end to each ITO region and the resistance of the V-corn signal inputted from the rear end to each ITO region. The largest difference of the resistances in the solution of prior art is 4R, but the resistance of the V-corn signal inputted to each ITO region in the first column is decreased from the largest 5R to 1.5R (the specific calculation can be referred to that in the first preferred embodiment of the present invention), and the largest difference of the resistances is 0.66R (the specific calculation can be referred to that in the first preferred embodiment of the present invention). Therefore, the uniformity of the resistances in the solution of the second preferred embodiment of the present invention is good. The second preferred embodiment of the present invention can effectively reduce the flicker and the regional mura of the display panel. When the TP functions, i.e. TP is in the TP sensing, then the switch signal outputs low voltage level, and all switches in the switch set 20 are deactivated, and all switches do not function. The V-corn signal cannot be transmitted to the ITO region, and TP scan will not be influenced.

In the second solution of the second preferred embodiment of the present invention, the aforesaid De voltage signal and the Do voltage signal specifically can be: a pair of positive and negative voltage signals when the touch panel is in the front detection (i.e. the IC is not online ready).

In one embodiment of the present invention, the aforesaid positive and negative voltage signals specifically can comprise: a high voltage level voltage signal and a low voltage level voltage signal, wherein the De voltage signal can be the high voltage level signal, and the Do voltage signal can be the low voltage level signal. In other embodiment of the present invention, the aforesaid positive and negative voltage signals specifically can comprise: a low voltage level voltage signal and a high voltage level voltage signal, wherein the De voltage signal can be the low voltage level signal, and the Do voltage signal can be the high voltage level signal.

In the touch panel field, the aforesaid high voltage level voltage signal generally can be named as a positive detection signal, and the aforesaid low voltage level voltage signal generally can be named as a negative detection signal.

The effect of the second preferred embodiment of the present invention is explained below according to the working principle of the second preferred embodiment of the present invention. As shown in FIG. 3, the adjacent S (source) electrodes of the plurality of switches are respectively inputted with the De voltage signal and the Do voltage signal through two metal wires 32. Because the switch set 30 is added at the rear end, as the TP does not function, the switch signal outputs high voltage level, and the switches of the switch set are all activated. Then, the De voltage signal and the Do voltage signal respectively can be a high voltage level voltage signal and a low voltage level voltage signal. Then, the plurality of adjacent switches are respectively inputted with the De voltage signal and the Do voltage signal. After the switches are activated, the De voltage signal and the Do voltage signal are respectively inputted into the adjacent ITO regions through the adjacent metal wires. Then, the adjacent ITO regions appear the states which are alternately bright and dark. If there is a damage ITO region in the com ITO, the damage ITO region will not appear the states which are alternately bright and dark with the adjacent ITO regions. Accordingly, the detection employee can easily distinguish the damage ITO region in the com ITO. Therefore, the second solution according to the second preferred embodiment of the present invention possesses the advantage of easy detection of damaged ITO region. When the TP functions, i.e. TP is in the TP sensing, then the switch signal outputs low voltage level, and all switches in the switch set 30 are deactivated, and all switches do not function. The V-com signal cannot be transmitted to the ITO region, and TP scan will not be influenced.

Please refer to FIG. 4. FIG. 4 is a diagram of a touch panel wire arrangement circuit according to the third preferred embodiment of the present invention. As shown in FIG. 4, the touch panel wire arrangement circuit can comprise: an ITO region 41, metal wires 42, a touch control hole 43 and an integrated circuit IC in the com ITO; wherein the present touch panel wire arrangement circuit is added with a front end switch set 40 and a rear end switch set 401, and both the front end switch set 40 and the rear end switch set 401 can comprise: a plurality of switches, and a G (gate) electrode of each switch in the plurality of switches is inputted with a switch signal, and D (drain) electrodes of the plurality of switches are sequentially coupled to the metal wires in the com ITO, and adjacent S (source) electrodes of the plurality of switches are respectively inputted with a De voltage signal and a Do voltage signal through two metal wires 42; the aforesaid switch signal specifically can be: a signal at high voltage level as a TP signal does not function; in the third preferred embodiment of the present invention, the aforesaid De voltage signal and the Do voltage signal specifically can be: a pair of positive and negative voltage signals when the touch panel is in the front detection (i.e. the IC is not online ready); the electric signals inputted to all the metal wires in the com ITO are the same electric signal, and the setting is to prevent the front end of the metal line to be inputted with the high voltage level voltage signal, and the rear end of the metal line to be inputted with the low voltage level voltage signal. Consequently, this will make that the voltage signals inputted to the same ITO region are different and cannot display.

In one embodiment of the present invention, the aforesaid positive and negative voltage signals specifically can comprise: a high voltage level voltage signal and a low voltage level voltage signal, wherein the De voltage signal can be the high voltage level signal, and the Do voltage signal can be the low voltage level signal. In other embodiment of the present invention, the aforesaid positive and negative voltage signals specifically can comprise: a low voltage level voltage signal and a high voltage level voltage signal, wherein the De voltage signal can be the low voltage level signal, and the Do voltage signal can be the high voltage level signal.

In the touch panel field, the aforesaid high voltage level voltage signal generally can be named as a positive detection signal, and the aforesaid low voltage level voltage signal generally can be named as a negative detection signal.

The solution of the third preferred embodiment of the present invention provides a front end switch set and a rear end switch set. Such solution decreases the resistances of the De voltage signal and the Do voltage signal inputted to the ITO region as front detection. Because the De voltage signal and the Do voltage signal can input the De voltage signal and the Do voltage signal through the front end switch set and the rear end switch set at the same time. Then, the resistances of the De voltage signal and the Do voltage signal inputted to the ITO region are similar with the resistance from the V-com signal to each ITO region in the first preferred embodiment of the present invention and the second preferred embodiment of the present invention, which all are resistances in parallel. Therefore, the third preferred embodiment of the present invention can effectively reduce the resistances of the De voltage signal and the Do voltage signal inputted into the ITO region as front detection.

Preferably, the aforesaid switches all can be TFTs (Thin Film Transistors). Certainly, in practical application, other types of switches, such as field effect transistors can be chose.

Please refer to FIG. 5, FIG. 6. FIG. 5 is a diagram of a touch panel wire arrangement circuit according to the fourth preferred embodiment of the present invention. FIG. 6 is an enlarged diagram of a front end switch set, wherein 60 represents the front end switch set; as shown in FIG. 5, the touch panel wire arrangement circuit can comprise: an ITO region 51, metal wires 52, a touch control hole 53 and an integrated circuit IC in the com ITO; wherein the present touch panel wire arrangement circuit is added with a front end switch set 50 and a rear end switch set 501, and both the front end switch set 50 and the rear end switch set 501 can comprise: a plurality of switches, and a G (gate) electrode of each switch in the plurality of switches is inputted with a switch signal, and D (drain) electrodes of the plurality of switches are sequentially coupled to the metal wires 52 in the com ITO, and the plurality of switches are divided into a plurality of switch sub sets in order, and each switch sub set comprises n (here, n=3 is illustrated) switches, and S (source) electrodes of the three switches in each switch sub set are respectively inputted with a De voltage signal, a Dm voltage signal and a Do voltage signal; the aforesaid switch signal specifically can be: a signal at high voltage level as the TP signal does not function; in the fourth preferred embodiment of the present invention, the De voltage signal, the Dm voltage signal and the Do voltage signal can be voltage signals of various voltage values as the touch panel is in front detection (i.e. the IC is not online ready); the voltage signals inputted to all the metal wires in the com ITO are the same voltage signal, and the setting is to prevent the front end of the metal line to be inputted with the high voltage level voltage signal, and the rear end of the metal line to be inputted with the low voltage level voltage signal. Consequently, this will make that the voltage signals inputted to the same ITO region are different and cannot display.

In one embodiment of the present invention, the aforesaid voltage signals of various voltage values specifically can comprise: a high voltage level voltage signal, a middle voltage level voltage signal and a low voltage level voltage signal, wherein the De voltage signal can be the high voltage level voltage signal, and the Dm voltage signal can be the middle voltage level voltage signal, and the Do voltage signal can be the low voltage level voltage signal. In another embodiment of the present invention, the aforesaid voltage signals of various voltage values also can be replaced. For instance, the Do voltage signal can be the high voltage level voltage signal, and the Dm voltage signal can be the middle voltage level voltage signal, and the De voltage signal can be the low voltage level voltage signal; certainly, it also can be that the Dm voltage signal can be the high voltage level voltage signal, and the De voltage signal can be the middle voltage level voltage signal, and the Do voltage signal can be the low voltage level voltage signal; certainly in practical application, there are other combinations, too. In the fourth preferred embodiment of the present invention, it is not restricted that the aforesaid De, Dm, Do specifically belong to which voltage signals. AS long as the aforesaid De, Dm, Do voltage signals are different; the repeated description is omitted here.

The solution of the fourth preferred embodiment of the present invention provides a front end switch set and a rear end switch set. Such solution decreases the resistances of the three kinds of voltage signals inputted to the ITO region as front detection. Because the voltage signals of three kinds can be inputted into the ITO region through the front end switch set and the rear end switch set at the same time. Then, the resistances of the voltage signals of three kinds inputted into the ITO region are similar with the resistance from the V-com signal to each ITO region in the first preferred embodiment of the present invention and the second preferred embodiment of the present invention, which all are resistances in parallel. Therefore, the fourth preferred embodiment of the present invention can effectively reduce the resistances of the voltage signals of three kinds inputted into the ITO region as front detection. However, compared with the third preferred embodiment of the present invention, one metal line is added, the wiring is complicated, which results in the increase of the integration, and the cost is increased. Besides, if n is larger than 3, the connection of the corresponding switches is similar with the connection as the n is equal to 3. The technical result and drawback are similar with that as then is equal to 3. The repeated description is omitted here.

Besides, the present invention further provides a display device. The display device comprises the aforesaid display panel. The display panel comprises: the touch panel wire arrangement circuit, and the specific structure of the touch panel wire arrangement circuit can be referred to figures and the descriptions of the first, second, third, fourth preferred embodiment. The repeated description is omitted here.

Above are embodiments of the present invention, which does not limit the scope of the present invention. Any modifications, equivalent replacements or improvements within the spirit and principles of the embodiment described above should be covered by the protected scope of the invention.

What is claimed is:

1. A touch panel wire arrangement circuit, the touch panel wire arrangement circuit comprises: an ITO region, metal wires, a touch control hole and an integrated circuit in common Indium Tin Oxide com ITO; wherein the touch panel wire arrangement circuit further comprises:

a rear end switch set, and the rear end switch set comprises: a plurality of switches, and a G electrode of each switch in the plurality of switches is inputted with a switch signal, and D electrodes of the plurality of switches are sequentially coupled to rear ends of the metal wires, and S electrodes of the plurality of switches are inputted with at least one voltage signals;

the switch signal is: a signal at high voltage level as a touch panel TP signal does not function; the voltage signal is a common voltage V-com signal as the touch panel is in a display state, wherein the rear end switch set comprises: a plurality of rear end switch sub sets divided in order, and the rear end switch sub set comprises: n switches, and S electrodes of the n switches are respectively inputted with n voltage signals through n metal wires, and the n voltage signals are: voltage signals of n various voltage signal values as the touch panel is in a front section detection; the n is a natural number larger than or equal to 2.

2. The touch panel wire arrangement circuit according to claim 1, wherein the touch panel wire arrangement circuit further comprises a front end switch set, and the front end switch set comprises: a plurality of front end switch sub sets divided in order, and the front end switch sub set comprises: n switches, and S electrodes of the n switches are respectively inputted with n voltage signals through n metal lines, and the n voltage signals are: voltage signals of n various voltage signal values as the touch panel is in a front section detection; a G electrode of each switch in n switches is inputted with a switch signal, and D electrodes of the n switches are sequentially coupled to front ends of the metal wires; voltages inputted to all the metal wires are the same voltage signal.

3. The touch panel wire arrangement circuit according to claim 2, wherein the n is equal to 2.

4. The touch panel wire arrangement circuit according to claim 1, wherein the n is equal to 2.

5. The touch panel wire arrangement circuit according to claim 1, wherein the switch is a thin film transistor TFT.

6. A display panel, wherein the display panel comprises a touch panel wire arrangement circuit, the touch panel wire arrangement circuit comprises: an ITO region, metal wires, a touch control hole and an integrated circuit in common Indium Tin Oxide com ITO; wherein the touch panel wire arrangement circuit further comprises:

a rear end switch set, and the rear end switch set comprises: a plurality of switches, and a G electrode of each switch in the plurality of switches is inputted with a switch signal, and D electrodes of the plurality of switches are sequentially coupled to rear ends of the metal wires, and S electrodes of the plurality of switches are inputted with at least one voltage signals;

the switch signal is: a signal at high voltage level as a touch panel TP signal does not function; the voltage signal is a common voltage V-com signal as the touch panel is in a display state, wherein the rear end switch set comprises: a plurality of rear end switch sub sets divided in order, and the rear end switch sub set comprises: n switches, and S electrodes of the n switches are respectively inputted with n voltage signals through n metal wires, and the n voltage signals are: voltage signals of n various voltage signal values as the touch panel is in a front section detection; the n is a natural number larger than or equal to 2.

7. The display panel according to claim 6, wherein the touch panel wire arrangement circuit further comprises a front end switch set, and the front end switch set comprises: a plurality of front end switch sub sets divided in order, and the front end switch sub set comprises: n switches, and S electrodes of the n switches are respectively inputted with n voltage signals through n metal lines, and the n voltage signals are: voltage signals of n various voltage signal values as the touch panel is in a front section detection; a G electrode of each switch in n switches is inputted with a switch signal, and D electrodes of the n switches are sequentially coupled to front ends of the metal wires; voltages inputted to all the metal wires are the same voltage signal.

8. The display panel according to claim 7, wherein the n is equal to 2.

9. The display panel according to claim 6, wherein the n is equal to 2.

10. The display panel according to claim 6, wherein the switch is a thin film transistor TFT.

11. A display device, wherein the display device comprises: a display panel, and the display panel comprises a touch panel wire arrangement circuit, the touch panel wire arrangement circuit comprises: an ITO region, metal wires, a touch control hole and an integrated circuit in common Indium Tin Oxide com ITO; wherein the touch panel wire arrangement circuit further comprises:

a rear end switch set, and the rear end switch set comprises: a plurality of switches, and a G electrode of each switch in the plurality of switches is inputted with a switch signal, and D electrodes of the plurality of switches are sequentially coupled to rear ends of the metal wires, and S electrodes of the plurality of switches are inputted with at least one voltage signals;

the switch signal is: a signal at high voltage level as a touch panel TP signal does not function; the voltage signal is a common voltage V-com signal as the touch panel is in a display state, wherein the rear end switch set comprises: a plurality of rear end switch sub sets divided in order, and the rear end switch sub set comprises: n switches, and S electrodes of the n switches are respectively inputted with n voltage signals through n metal wires, and the n voltage signals are: voltage signals of n various voltage signal values as the touch panel is in a front section detection; the n is a natural number larger than or equal to 2.

12. The display device according to claim 11, wherein the touch panel wire arrangement circuit further comprises a front end switch set, and the front end switch set comprises: a plurality of front end switch sub sets divided in order, and the front end switch sub set comprises: n switches, and S electrodes of the n switches are respectively inputted with n voltage signals through n metal lines, and the n voltage signals are: voltage signals of n various voltage signal values as the touch panel is in a front section detection; a G electrode of each switch in n switches is inputted with a switch signal, and D electrodes of the n switches are sequentially coupled to front ends of the metal wires; voltages inputted to all the metal wires are the same voltage signal.

13. The display device according to claim 12, wherein the n is equal to 2.

14. The display device according to claim 11, wherein the n is equal to 2.

15. The display device according to claim 11, wherein the switch is a thin film transistor TFT.

* * * * *